(12) United States Patent
Young

(10) Patent No.: US 9,534,150 B2
(45) Date of Patent: Jan. 3, 2017

(54) TEMPORARY REUSABLE RETROREFLECTIVE RAISED PAVEMENT MARKER

(71) Applicant: Roger Young, Santa Rosa, CA (US)

(72) Inventor: Roger Young, Santa Rosa, CA (US)

( * ) Notice: Subject to any disclaimer, the term of this patent is extended or adjusted under 35 U.S.C. 154(b) by 145 days.

(21) Appl. No.: 14/567,869

(22) Filed: Dec. 11, 2014

(65) Prior Publication Data

US 2016/0168808 A1    Jun. 16, 2016

(51) Int. Cl.
| | |
|---|---|
| *E01F 9/06* | (2006.01) |
| *C09J 7/02* | (2006.01) |
| *E01F 9/00* | (2016.01) |
| *B32B 5/02* | (2006.01) |
| *B32B 27/12* | (2006.01) |
| *B32B 27/18* | (2006.01) |
| *B32B 3/30* | (2006.01) |

(52) U.S. Cl.
CPC ............... *C09J 7/0264* (2013.01); *B32B 3/30* (2013.01); *B32B 5/024* (2013.01); *B32B 27/12* (2013.01); *B32B 27/18* (2013.01); *E01F 9/00* (2013.01); *E01F 9/553* (2016.02); *B32B 2262/02* (2013.01); *B32B 2262/0261* (2013.01); *B32B 2262/0276* (2013.01); *B32B 2264/101* (2013.01); *B32B 2307/306* (2013.01); *B32B 2307/416* (2013.01); *B32B 2307/422* (2013.01); *B32B 2307/536* (2013.01); *B32B 2307/554* (2013.01); *B32B 2307/558* (2013.01); *B32B 2307/71* (2013.01); *B32B 2307/712* (2013.01); *B32B 2307/72* (2013.01); *B32B 2405/00* (2013.01); *B32B 2590/00* (2013.01)

(58) Field of Classification Search
CPC ........................................................ E01F 9/06
See application file for complete search history.

(56) References Cited

U.S. PATENT DOCUMENTS 5,981,033 A   *   11/1999   Haunschild ............. E01F 9/512
                                                                                                                       404/12

OTHER PUBLICATIONS

Federal TTB-1325 standard, May 2012.*

* cited by examiner

*Primary Examiner* — Ian Rummel
(74) *Attorney, Agent, or Firm* — Craig A. Simmermon

(57) ABSTRACT

The present invention incorporates to a new temporary, reusable, retroreflective, raised pavement marker design. The pavement marker utilizes a water soluble, adhesive embedded in a fibrous base material for application to the pavement. This temporary adhesion method allows the pavement marker to be reused after removal from the pavement. The semispherical shape of the marker provides increased lateral stability. The recesses on the top surface of the marker protect the retroreflective microspheres from loss of retrorefectivity from vehicular abrasion. The round shape also allows the marker to be used to form arrows and other pavement markings.

7 Claims, 1 Drawing Sheet

TEMPORARY REUSABLE RETROREFLECTIVE RAISED PAVEMENT MARKER

CROSS-REFERENCE TO RELATED APPLICATIONS

Not Applicable

STATEMENT REGUARDING FEDERALLY SPONSERED RESEARCH OR DEVELOPMENT

Not Applicable

Figure 1:
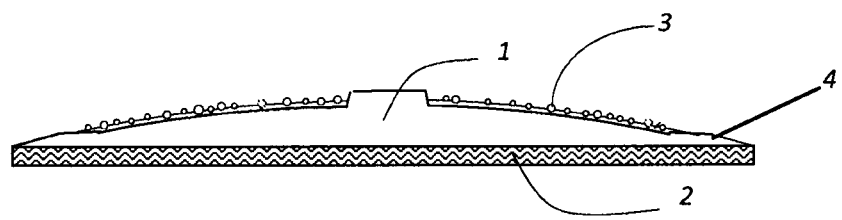

REFERENCE TO SEQUENCE LISTING, A TABLE, OR A COMPUTER PROGRAM LISTING COMPACT DISC APPENDIX

Not Applicable

FIELD OF INVENTION

The present invention is in the technical field of roadway transportation devices. More particularly, the present invention is in the field of traffic control devices on roadways with roadwork that requires altering the existing flow of vehicular traffic or restoring markings that have been obliterated during construction.

BACKGROUND OF THE INVENTION

Markings applied to roadway pavements to guide traffic in construction type operations usually require a temporary existence. The present invention is a new temporary, reusable, raised pavement marker. The present method of guiding traffic through or around roadway work sites involves the use of portable signs, cones, delineators, electric arrow boards, flaggers etc. The only temporary pavement markers in use today for lane lines are made of flexible plastic with an adhesive pad or an adhesive foil type tape. Temporary markings for straight arrows, turn arrows, crosswalks and limit lines usually use a foil tape with adhesive backing or paint. These types of temporary markings are expensive, difficult to remove and are not reusable. Existing temporary pavement markers involve a type of chemical adhesive which limits the device to one use. The present invention utilizes a remoistenable adhesive combined with a high strength microfiber material that allows the temporary pavement markers to be easily removed and used repeatedly. Further, said markings can be used in hot, cold, wet and windy conditions.

SUMMARY OF THE INVENTION

The present invention is an article of manufacture that constructs a raised pavement marking device that can be configured to establish a temporary lane stripe, turn arrow, straight arrow, limit line, crosswalk, or pavement legend when needed for safe movement of traffic. The present invention is the design of materials that will adhere to concrete or asphalt pavement with sufficient strength to remain where placed despite impacts from vehicles or any other environmental factors and provides sufficient retroreflectivity and luminance to be visible to motorist's day or night. Furthermore, said pavement marker can be easily removed and reused.

BRIEF DESCRIPTIONOF THE DRAWING

Figure 2:
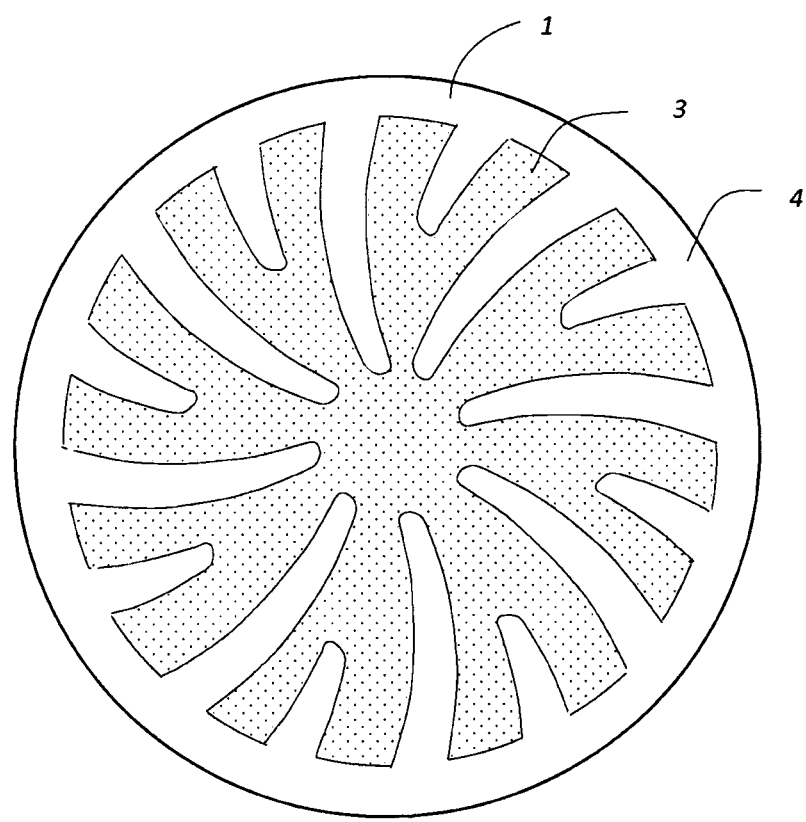

FIG. 1 is a cross section view of the present invention.
FIG. 2 shows the top view of present invention.

DETAILED DESCRIPTION OF THE INVENTION

Referring now to the invention in more detail, FIG. 1 shows a cross section of the 4 components of the pavement marker device. The dome shaped plastic body 1 of the device has a plurality of recesses to protect the retroreflective glass microspheres from vehicle damage. The plastic body 1 is molded with a thermoset or injection molded resin. The body 1 is coated with a durable material 4. Retroreflective microspheres 3 are spread onto the wet coating 4 in a controlled manner that causes about 40% to 60% of the diameter of each microsphere to be embedded in the coating material 4. The plastic body 1 is about 4 inches in diameter and approximately 0.3 inches in height.

The adhesive base layer material 2 is a woven split microfiber material that facilitates the adhesion of the device to the roadway surface. If thermoset resin is used the microfiber material 2 is welded to the resin 1 during the molding process when the plastic is in a molten state. If injection molding is used, the microfiber material 2 is welded to the body with a permanent waterproof adhesive. The polyester/nylon split microfiber material 2 shall have fiber diameters less than 0.2 denier. The thickness of the microfiber layer 2 shall be at least 0.125 inch and have a density of 360 to 400 grams per square meter. The microfiber material 2 shall not be made with recycled plastics. The washable adhesive is applied to the microfiber layer with a glue stick applicator before placement on the pavement. The marker remains stable if the microfiber layer 2 is soaked with water. The lateral stability created by the large coefficient of friction of the microfiber, the cohesive force of the water and the shape of the device is sufficient to eliminate any movement during use. If the water evaporates the adhesive dissolved in the water will bond the marker to the pavement.

The top view in FIG. 2 shows the random distribution of the glass microspheres 3 and the spacing of the cavities in the body 1. The plastic body of the marker assembly is constructed to protect the glass microspheres from abrasion damage and not allow water and fine particles to accumulate on the reflective surface. The plastic body of the device must has retroreflective night ability, daylight visibility, uv resistance, and abrasion resistance that are not diminished by vehicle impacts or weather conditions. The surface of the raised marker is coated with a material that resists abrasion and hot tire marks. The retroreflectivity level of the marker shall not be less than 200 measured at standard 30-m geometry in units of $mcd/m^2/lux$.

The invention claimed is:
1. A raised pavement marker comprising:
a base layer capable of adhering said raised pavement marker to a pavement surface; and
a top component, comprising: a semispherical shaped plastic body with retroreflective glass microspheres embedded in said semispherical shaped plastic body, wherein,
said raised pavement marker may be applied to said pavement surface, removed, and reapplied to said pavement surface, said base layer is capable of accepting an adhesive material for temporary adhesion to said pavement surface, said base layer is permanently attached to said top component, and said base layer is split microfiber material consisting of polyester and nylon fibers.

2. A raised pavement marker as recited in claim 1, wherein said base layer material has a density of 360-400 grams per square meter and is at least 0.125 inches thick.

3. A raised pavement marker as recited in claim 1, wherein said adhesive material is a polyvinyl acetate or other water miscible and remoistenable adhesive.

4. A raised pavement marker as recited in claim 1, wherein said top component is an abrasion resistant thermoset molded or injection molded resin with a hardness of D 70 to D 80.

5. A raised pavement marker as recited in claim 1, wherein said top component is about 4 inches in diameter and 0.1-0.4 inches in height.

6. A raised pavement marker as recited in claim 1, wherein said top component has a plurality of curved, longitudinal cavities radiating from its center.

7. A raised pavement marker as recited in claim 1, wherein said retroreflective glass microspheres are type 3 and exhibit a retroreflectance luminescence value of at least 200 mcd/$m^2$/lux under standard condition of wetness and comply to federal specification TTB-1325.

* * * * *